(12) United States Patent
Opdyke

(10) Patent No.: US 8,857,451 B2
(45) Date of Patent: Oct. 14, 2014

(54) DEVICE TO REMOVE SNOW FROM LARGE VEHICLES

(76) Inventor: David Opdyke, Secaucus, NJ (US)

( * ) Notice: Subject to any disclaimer, the term of this patent is extended or adjusted under 35 U.S.C. 154(b) by 413 days.

(21) Appl. No.: 12/584,109

(22) Filed: Aug. 31, 2009

(65) Prior Publication Data

US 2010/0059089 A1 Mar. 11, 2010

Related U.S. Application Data

(60) Provisional application No. 61/095,329, filed on Sep. 9, 2008.

(51) Int. Cl.
| | | |
|---|---|---|
| B60S 3/04 | (2006.01) | |
| B60S 3/00 | (2006.01) | |
| F04D 29/60 | (2006.01) | |
| B08B 5/02 | (2006.01) | |

(52) U.S. Cl.
CPC .. B60S 3/04 (2013.01); B60S 3/002 (2013.01); F04D 29/601 (2013.01); B08B 5/023 (2013.01)
USPC ....... 134/123; 134/94.1; 134/95.3; 134/103.2

(58) Field of Classification Search
None
See application file for complete search history.

(56) References Cited

U.S. PATENT DOCUMENTS

| | | | |
|---|---|---|---|
| 1,492,894 A | 5/1924 | Perego | |
| 1,611,273 A | 12/1926 | Kelso | |
| 3,104,406 A | 9/1963 | Rhodes | |
| 3,439,372 A | 4/1969 | Collier | |
| 3,451,094 A * | 6/1969 | Espada Kywi | 15/302 |
| 3,600,224 A * | 8/1971 | Stilwell | 134/6 |
| 3,996,948 A | 12/1976 | Wiley | |
| 4,263,729 A | 4/1981 | Minnen | |
| 5,755,043 A * | 5/1998 | Belanger et al. | 34/666 |
| 5,802,654 A | 9/1998 | Yeaglin | |
| 5,989,356 A | 11/1999 | Candeletti | |
| 6,654,978 B2 | 12/2003 | Bouchard | |
| 6,842,997 B1 * | 1/2005 | Fratello et al. | 34/418 |
| 7,040,328 B2 | 5/2006 | Woodward | |
| 7,143,771 B2 | 12/2006 | Kaipainen | |
| 2001/0027584 A1 | 10/2001 | Bouchard | |
| 2008/0083428 A1 * | 4/2008 | Johnston et al. | 134/4 |
| 2008/0223405 A1 * | 9/2008 | Allaire | 134/18 |

* cited by examiner

*Primary Examiner* — Michael Kornakov
*Assistant Examiner* — Ryan Coleman
(74) *Attorney, Agent, or Firm* — Gearhart Law, LLC

(57) ABSTRACT

An article of manufacture suitable for cleaning the top of a vehicle, comprising: at least one blower: and a support for said blower, wherein said support positions the blower to blow snow or debris from the top of a vehicle. This invention improves on prior art by using blowers to remove snow from large vehicles.

11 Claims, 5 Drawing Sheets

DEVICE TO REMOVE SNOW FROM LARGE VEHICLES

CLAIM OF PRIORITY

This application claims the priority of U.S. Ser. No. 61/095,329 filed on Sep. 9, 2008, the contents of which are fully incorporated herein by reference.

FIELD OF THE INVENTION

The invention relates to the removal of snow and other debris from large motor vehicles such as tractor-trailer trucks, moving vans, cattle trucks and so forth.

BACKGROUND OF THE INVENTION

A device to clean snow and debris of the roofs of large vehicles is specified. It includes blowers and may be attached to a building or on a freestanding tower.

Driving safety is of paramount concern to drivers of vehicles. One typical safety challenge, especially for drivers of large vehicles, is that the top of the vehicle becomes covered with snow or ice during the winter months. Large vehicles, such as 18 wheelers, have large trailers that can become covered with snow and ice during winter storms. When the vehicle hits the road, the area behind the truck becomes a blizzard as the snow and ice blow off the top of the cab and trailer. This blizzard effect greatly reduces visibility, creating a serious and unanticipated safety hazard for the traffic to the rear of the vehicle. It is especially dangerous if the truck is turning onto a highway and the traffic is traveling at high speeds on icy roads.

Moreover, if the snow and ice remain on the vehicle it adds weight and drag to the rig which reduces fuel economy. While the present invention has particular application for snow and ice removal, it could also be used for blowing off other types of debris, such as, but not limited to, dirt, leaves, chemicals, dust, etc.

DESCRIPTION OF THE RELATED ART

U.S. Pat. No. 1,492,894 teaches to an automobile top duster whereby the top of automobiles or other vehicles may be kept clean substantially without the attention upon the part of the driver, the duster being so arranged that each time the driver drives out of the garage, or back into the garage, that the dust adhering to the top will be brushed off, the duster being arranged over the top of the car and being of a length somewhat greater than the total width of the top.

U.S. Pat. No. 1,611,273 teaches a means adapted to be supported in operative position in or at the entrance of garage for the storage of an automobile for engagement with the top thereof, whereby the dust collected on the top may be removed each time the vehicle is moved thereunder.

U.S. Pat. No. 3,104,406 teaches an apparatus for cleaning large objects such as trucks, and particularly such objects having irregular outer surfaces, for example cement transporting and mixing trucks, and particularly those provided with rotary drums.

U.S. Pat. No. 3,439,372 teaches a device for washing airplanes has a vehicle carrying washing supplies and a rotatable turntable orientable to various positions and carrying an operator's station and controls for an extensible boom on which a rotary power driven scrubbing brush is mounted. The brush mounting permits the brush to be variously oriented and includes-means for maintaining a selected brush pressure against the surface being washed.

U.S. Pat. No. 3,996,948 teaches a truck wash apparatus wherein the truck is moved through the car wash apparatus which includes a pair of vertical supports mounted along the path of the truck such that the truck moves between the supports. A plurality of rotating spray nozzles for dispensing fluid are mounted on the vertical supports for rotation and for indexing between three positions wherein the plane of rotation of said applicator is parallel to the path of the truck, at an angle facing the truck as the truck approaches the supports, at an angle facing away from the truck as the truck moves away from the supports. As the truck moves toward the supports, the rotating spray nozzles are positioned at an angle to the oncoming truck to wash the front of the truck, as the truck continues to move through the system and between the supports, the rotating nozzles are indexed to a position wherein the plane thereof is generally parallel to the path of the truck, and as the truck finally moves away from the supports, the rotating nozzles are indexed such that the planes thereof are at an angle for directing fluid toward the rear of the truck.

U.S. Pat. No. 4,263,729 teaches a scraping device the control means of which comprise an electric motor fastened to said fixed part and so arranged as to rotate a drive wheel driving a cable, chain or similar which is connected with the one end thereof to the movable arm free end, in the direction for raising said movable arm against the spring force, a housing for storing said cable, chain or similar in the movable arm upper position being provided upstream of the drive wheel, and an electric device for locking and releasing said movable arm, as well as electric connections connecting said electric motor and electric locking and releasing device to the vehicle driver positions.

U.S. Pat. No. 5,802,654 teaches an apparatus is a snow and ice remover for the roofs of trucks and trailers. A bridge like structure of two vertical beams and an upper cross piece supports a vertically adjustable snow plow assembly which rolls on wheels riding on the vertical beams. A wedge shaped plow forms the lower edge of the snow plow assembly so that when a snow or ice covered truck or trailer moves under the properly positioned plow, the snow or ice is pushed off the top of the vehicle. The snow plow has a minimum height below which it can not be lowered, and the adjustment of the snow plow is powered by a winch on the cross beam which reels in or releases a chain from which the snow plow is hung.

U.S. Pat. No. 5,989,356 teaches an apparatus for removing snow accumulation from motor vehicle roofs. The snow scraping apparatus has a scraping assembly adapted to remove snow from a motor vehicle roof and including a scraping member being horizontally oriented. The snow scraping apparatus also has a supporting assembly for holding the scraping assembly in an elevated position so that the motor vehicle can pass beneath the scraping member without interference. The scraping member is elevated from the ground by a height that is substantially the same as or slightly greater than that of the motor vehicle roof. As a result, the scraping member can remove snow accumulation from the motor vehicle roof as the motor vehicle passes beneath the scraping assembly. If desired, the scraping assembly can be a rotatable brushing member for removal of snow accumulation by tossing or throwing the snow away from the vehicle roof.

U.S. Pat. No. 6,654,978 teaches a snow removing device for removing snow and ice from the roof of semi-trailers, vans and similar vehicles. The snow removing device includes; a scraping blade slidably mounted for vertical movement between spaced apart vertical frame posts. A mechanism is provided for automatically adjusting the position of the scraping blade relative to the vehicle's roof so as to maintain predetermined blade spacing between the blade lower peripheral edge and the vehicle's roof in order to prevent the scraping blade from damaging structures protruding from the vehicle's roof. A resilient skirt extends from the scraping blade so as to fill the spacing there underneath and so as to contact the vehicle's roof. A mechanism is also provided for adjusting the amount of pressure exerted by the scraping blade and resilient skirt on the vehicle's roof depending on the consistency of the snow being scraped. A breaking assembly is further provided for breaking slabs of hardened snow and ice supported on the vehicle's roof. A mechanism is provided for adjusting the height of the breaking assembly. Another mechanism is provided for adjusting the pressure exerted by the breaking assembly on the vehicle's roof.

U.S. Pat. No. 7,040,328 teaches a combination fluid and air washing apparatus for washing a vehicle's viewing surface. The apparatus includes a housing, a nozzle assembly with at least one fluid nozzle and at least one air nozzle corresponding to each of fluid nozzles. A shaft is pivotally attached to the housing. The fluid and air nozzles are adjacently attached to the shaft and point towards the vehicle viewing surface. The air nozzle points lower on the vehicle viewing surface than the fluid nozzle. A pressured lines provides pressured air to the washing apparatus. The air compressor provides pressured air to the fluid reservoir forcing the fluid through the fluid nozzle and the air compressor simultaneously provides pressured air through the line to the air nozzle. Thus, the vehicle's viewing surface with the fluid and the fluid washes the vehicle's viewing surface and the air dries the vehicle's viewing surface.

U.S. Pat. No. 7,143,771 teaches a vehicle wash system having a series of spray assemblies for use in cleaning vehicles such as a highway salt truck. As the vehicle is driven through the vehicle wash system, sensors alert the control system as to the location of the vehicle. While using a single pump, the control system then activates and deactivates valves to selectively open and close high pressure flow paths to various spray assemblies as the vehicle moves through the vehicle wash system. The nozzles in the spray assemblies receive full pressure water when the corresponding valve is opened and are oriented to clean specific portions of the vehicle in a predetermined sequence.

U.S. Patent application No. 20010027584 teaches a snow removing device for removing snow and ice from the roof of semi-trailers, vans and similar vehicles. The snow removing device includes; a scraping blade slidably mounted for vertical movement between spaced apart vertical frame posts. A mechanism is provided for automatically adjusting the position of the scraping blade relative to the vehicle's roof so as to maintain predetermined blade spacing between the blade lower peripheral edge and the vehicle's roof in order to prevent the scraping blade from damaging structures protruding from the vehicle's roof. A resilient skirt extends from the scraping blade so as to fill the spacing there underneath and so as to contact the vehicle's roof. A mechanism is also provided for adjusting the amount of pressure exerted by the scraping blade and resilient skirt on the vehicle's roof depending on the consistency of the snow being scraped. A breaking assembly is further provided for breaking slabs of hardened snow and ice supported on the vehicle's roof. A mechanism is provided for adjusting the height of the breaking assembly. Another mechanism is provided for adjusting the pressure exerted by the breaking assembly on the vehicle's roof.

None of the prior art describes a snow removal device for large vehicles that uses blowers.

SUMMARY OF THE INVENTION

An article of manufacture suitable for cleaning the top of a vehicle, having at least one blower, and a support for said blower or blowers, wherein said support positions the blower to blow snow or debris from the top of a vehicle. This invention improves on prior art by using blowers to remove snow from large vehicles.

DESCRIPTION OF THE PREFERRED EMBODIMENTS

Figure 1:
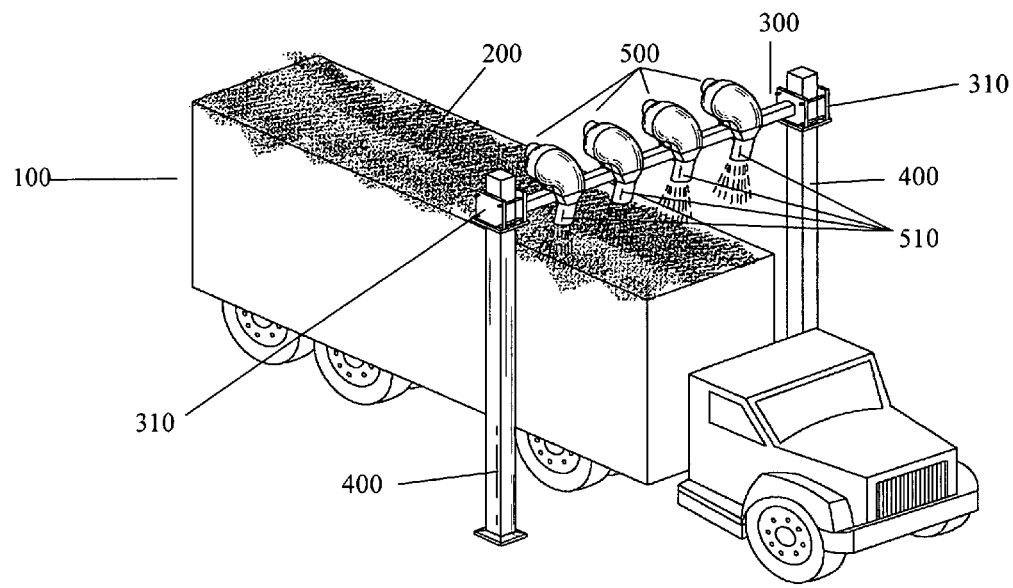
FIG. 1 shows the invention in use in a view from above and rotated to the side of the front of the vehicle 100.

The preferred embodiments of the present invention will now be described with reference to the drawings. Identical elements in the various figures are identified with the same reference numerals.

FIG. 1 shows the invention in use in a view from above and rotated to the side of the front of the vehicle 100. The invention is shown with two towers 400, a support 300, and four blowers 500. The support 300 is shown with brackets 310 at both ends. The brackets 310 are shown as the connection from the support 300 to the towers 400. The four blowers 500 are shown attached to the support. Each blower is shown with a blower nozzle 510. The vehicle 100 is driven under the support 300 while the blowers 500 blow the snow 200 or debris off the top of the vehicle. The support 300 and the towers 400 are shown as non-latticework constructions.

Figure 2:
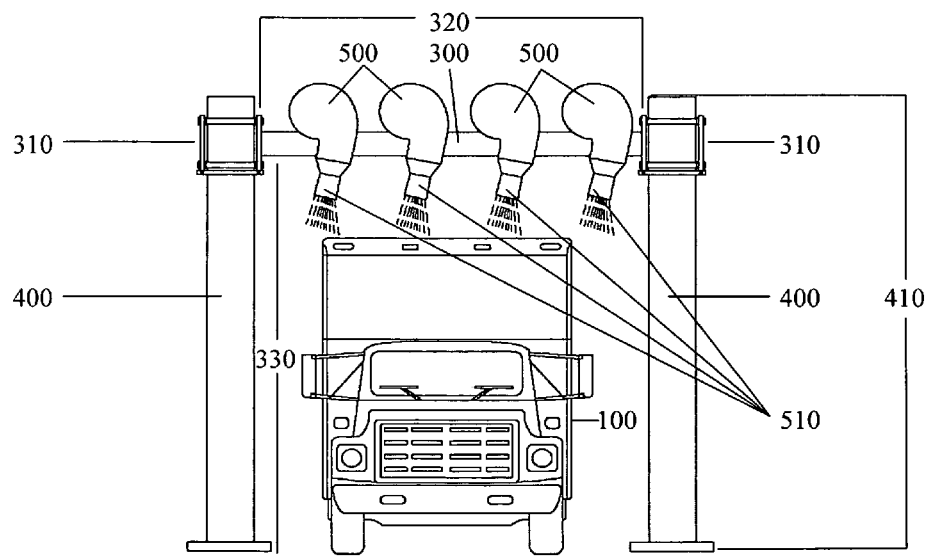
FIG. 2 shows the invention in a front perspective view with a vehicle 100 being driven under the support 300.

FIG. 2 shows the invention in a front perspective view with a vehicle 100 being driven under the support 300. The invention is shown with two towers 400, a support 300, and four blowers 500. The support 300 is shown with two brackets 310, support length 320, and support height 330. The towers 400 are shown with a tower height 410. The four blowers 500 are shown attached to the support 300. Each blower is shown with a blower nozzle 510. The support 300 and the towers 400 are shown as non-latticework constructions.

Figure 3:
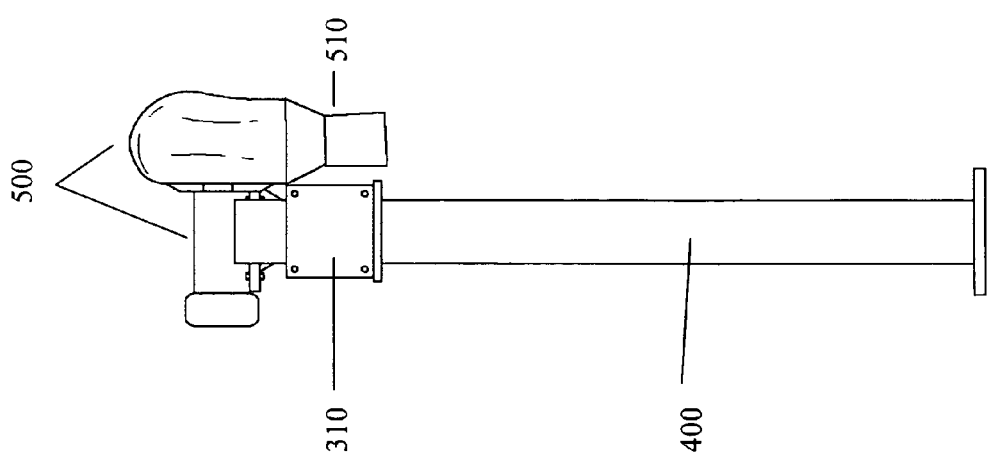
FIG. 3 shows a side prospective view of the invention.

FIG. 3 shows a side prospective view of the invention. The invention is shown with a tower 400, a bracket 310, a blower 500 and a blower nozzle 510. The tower 400 is shown as a non-latticework construction.

Figure 4:
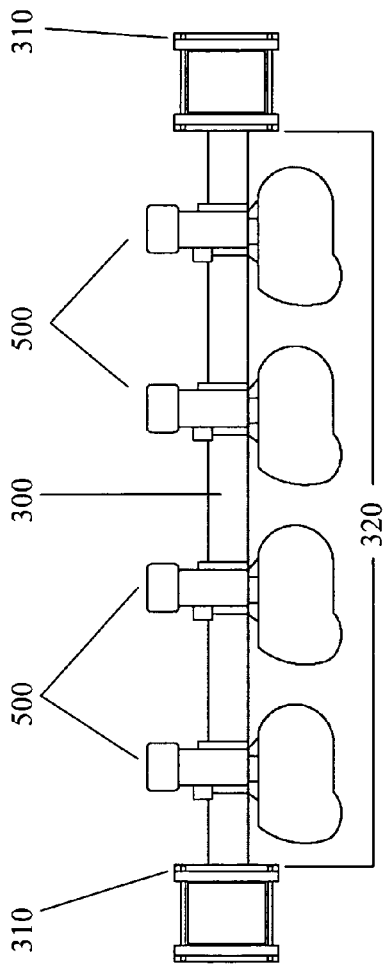
FIG. 4 shows an overhead prospective view of the invention.

FIG. 4 shows an overhead prospective view of the invention. The invention is shown with support 300, two brackets 310, support length 320, and four blowers 500. The support 300 is shown as a non-latticework construction.

Figure 5:
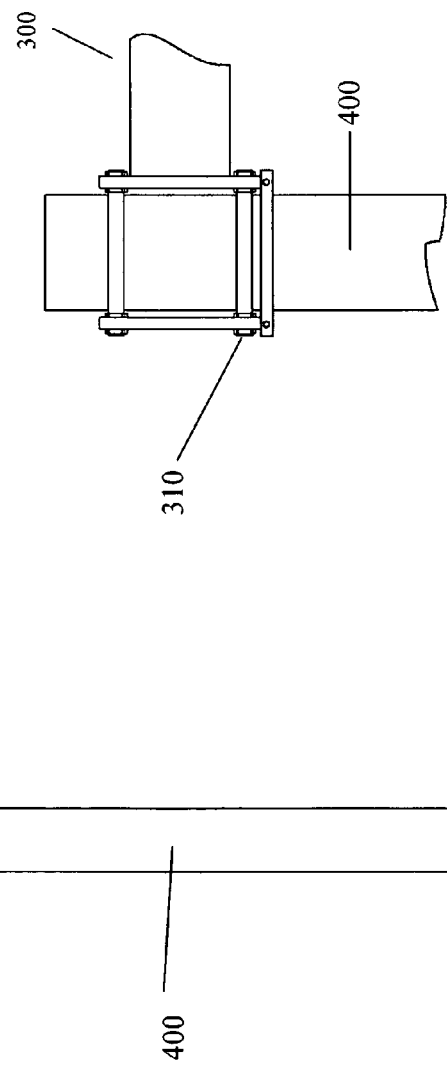
FIG. 5 shows a close up view of the invention with the support 300 attached to the tower 400.

FIG. 5 shows a close-up view of the invention with the support 300 attached to the tower 400. The bracket 310 is shown as the part of the support 300 that attaches to the tower 400. The support 300 and the tower 400 are shown as non-latticework constructions.

Figure 6:
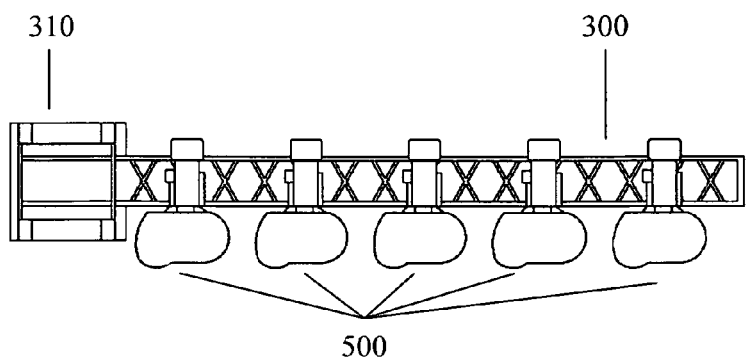
FIG. 6 shows an overhead prospective view of the invention.

FIG. 6 shows an overhead prospective view of the invention. The invention is shown with support 300, bracket 310 and five blowers 500. The support 300 is shown as a latticework construction.

Figure 7:
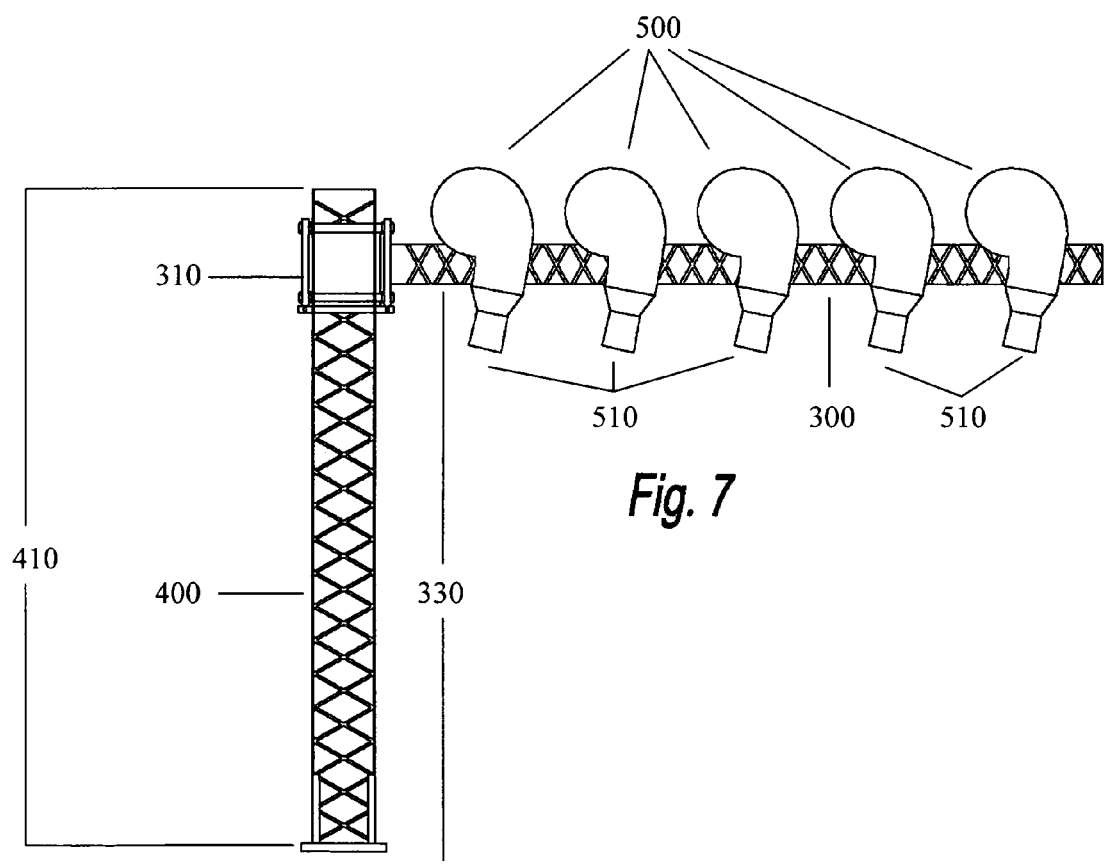
FIG. 7 shows a front prospective view of the invention with a single tower.

FIG. 7 shows a front prospective view of the invention with a single tower. The invention is shown with support 300 and tower 400. The support 300 is shown with the support height 330. The tower 400 is shown with the tower height 410. Each blower 500 is shown with a blower nozzle 510. The tower 400 and the support 300 are shown as latticework constructions.

Figure 8:
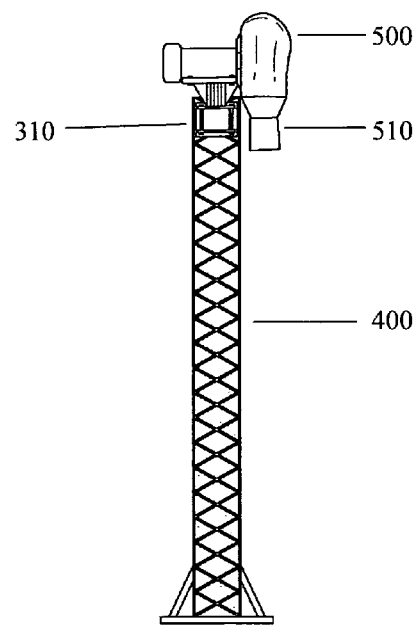
FIG. 8 shows a side prospective view of the invention.

FIG. 8 shows a side prospective view of the invention. The invention is shown with a tower 400, bracket 310, blower 500 and blower nozzle 510. The tower 400 is shown as a latticework construction.

Figure 9:
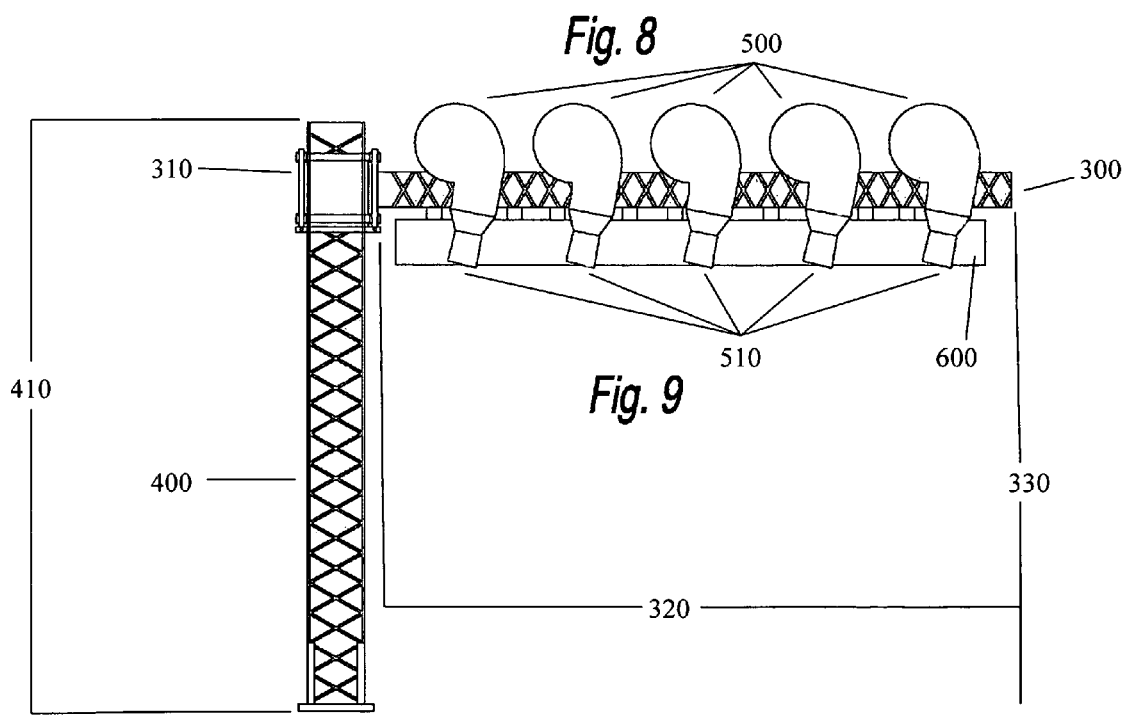
FIG. 9 shows a front prospective view of the invention.

FIG. 9 shows a front prospective view of the invention. The invention is shown with the support 300 and the tower 400. The support 300 is shown with bracket 310, support length 320, support height 330, five blowers 500 and scraping assembly 600. The tower 400 is shown with tower height 410. Each blower 500 is shown with a blower nozzle 510. The support 300 and the tower 400 are shown as latticework constructions.

Figure 10:
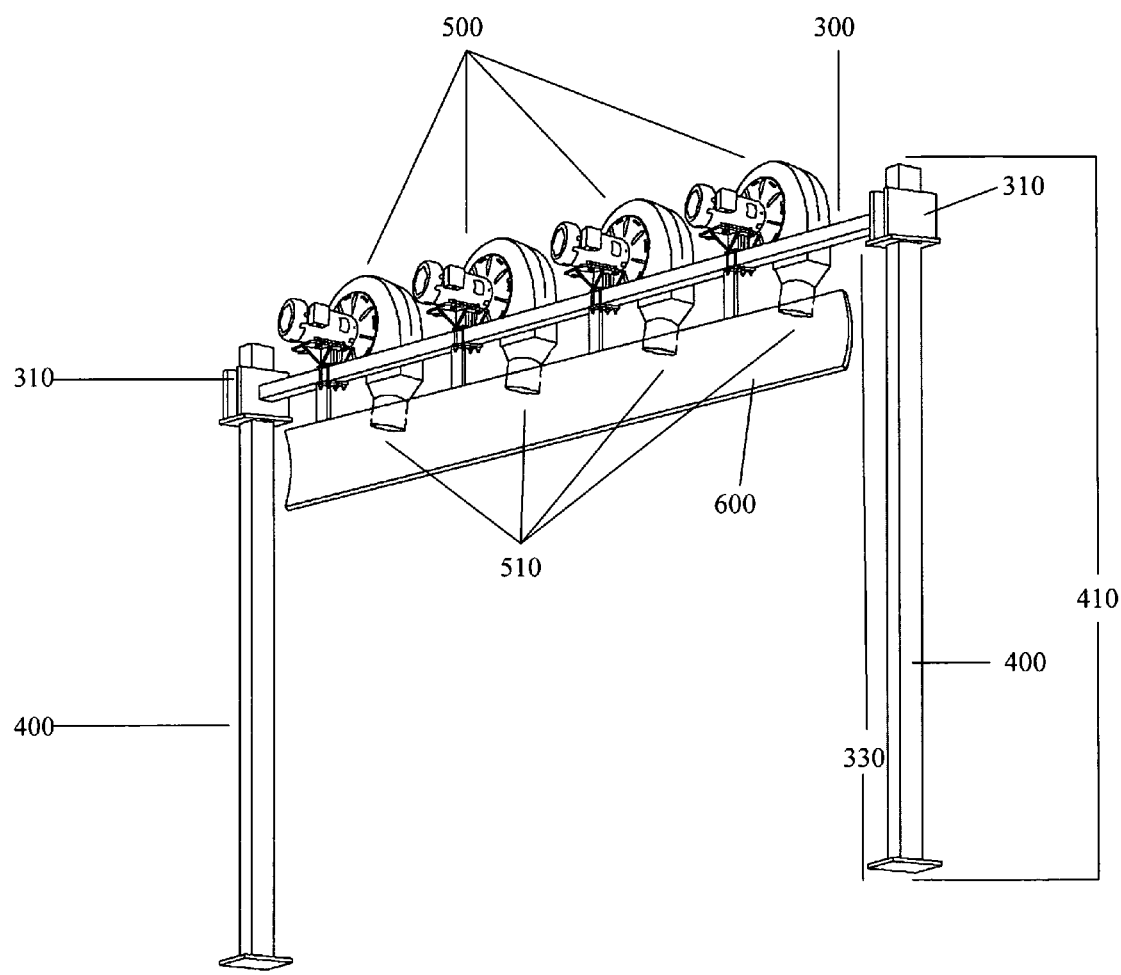
FIG. 10 shows a low angle front prospective view of the invention.

FIG. 10 shows a low angle askew front prospective view of the invention. The invention is shown with the support 300 and two towers 400. The support 300 is shown with two brackets 310, support height 330, four blowers 500, and scraping assembly 600. The tower 400 is shown with tower height 410. Each blower is shown with a blower nozzle 510. The support 300 and the tower 400 are shown as non-latticework constructions.

The preferred embodiment of this invention is comprised of at least one blower 500 and a support 300. The support 300 may be constructed from a wide variety of materials including but not limited to: wood, plastic, metal and composites. The support 300 may be constructed as a latticework or a non-latticework. The preferred embodiment may have more then one blower 500. The number of blowers includes but is not limited to one, two, three, four, or five. The blower 500 or blowers 500 are attached to the support 300. Infra, the mention of only the singular or plural of blower is to be interpreted as including both the singular and plural of blower. The airflow from the blowers 500 may be adjustable based on the speed of the vehicle driving under the support. The blower or blowers may be fitted with nozzles of differing sizes and shapes that are most effective for the application. The power of the blower can vary depending on the number of blowers, but will likely be from 100 to 6500 CFM. In preferred embodiments the blowers are variable speed and the CFM can be adjusted based on the need for power, which may depend for example on the height of the snow or the speed at which the vehicle travels through the supports. Alternatively, the blowers may be of a fixed speed. While it is not shown in the drawings, the support may further include a mechanism which allows the orientation of a particular blower or blowers to be adjusted remotely. For example, and by way of illustration only, it may be preferable for certain vehicles that the outside blowers be oriented at a different angle than the inside blowers. The angles of the blowers could be adjusted manually or automatically, or could be adjusted at a control console or by an operator remotely located. While the preferred embodiment of the invention has blowers on the support, it is also possible that one or more blowers could be mounted on the side, such as on one or both towers. It may be desirable to have one or more supports and/or towers in sequence. While in most applications, the blower will use ambient air, the air could also be warmed with a heater or heaters prior to or after entering the blowers.

The invention also may include other optional features, such a pay box, which allows a user to operate the blower system when an appropriate amount of money is put in the box via cash or a credit card reader. In addition to the blowers, the blower support may also have a deicer system that sprays a chemical deicer treatment on a vehicle.

The support 300 may have a length, which may be 8 ft to 15 ft. The support 300 may have support height 330 which may be fixed or variable. The support height 330 may be adjusted based on the height of the vehicle. Methods of adjustment of the support height 330 include but are not limited to: direct motor drive; motor or manual crank system; motor or manual pulley system; motor or manual gearing system. The support height may be 8 ft to 15 ft. Each blower 500 may have a blower nozzle 510. The blower nozzle 510 may be adjustable in the vertical and horizontal directions. The support 300 may have one or more brackets 310. The bracket 310 may used to attach the support 300 to a structure. Possible structures include but are not limited to: buildings and towers 400. Possible numbers of towers 400 include but are not limited to one and two. When the support 300 is attached to a tower 400 the support height 330 may be fixed or variable. A tower 400 may be constructed from a wide variety of materials including but not limited to: wood, plastic, metal and composites. The tower 400 may be constructed as a latticework or a non-latticework. The tower 400 may have a tower height 410 that is from 8 ft to 15 ft. The invention may include a scraping assembly 600. Possible materials for the scraping assembly include but are not limited to metal, plastic, wood, rubber and composites. The scraping assembly may have a planar, angled or v-shaped blade configuration so that the snow or debris is moved to the side as the vehicle moves past. It may be in parallel orientation to the support or may be oriented at angle. In another embodiment, the scraper assembly is a brush or flexible rubber. The scraping assembly may be fixed in height or it may move up and down with the movable support 300, or may move independently of the support 300. A vehicle 100 is driven under a support 300 and the blowers 500 blow the snow and other debris off the roof of the vehicle. Additionally, other functionalities may be applied to the vehicle when it is driving under the support 300. Other functionalities include but are not limited to deicing means and the scraping assembly.

Although this invention has been described with a certain degree of particularity, it is to be understood that the present disclosure has been made only by way of illustration and that numerous changes in the details of construction and arrangement of parts may be resorted to without departing from the spirit and the scope of the invention.

I claim:

1. An article of manufacture suitable for cleaning the top of a vehicle, comprising: at least one blower and a support for said at least one blower, wherein said support positions the blower to blow snow or debris from the top of a vehicle; and wherein said support contains a separate singular, planar bladed scraping assembly designed to direct snow and debris from the top of a vehicle and wherein said support contains a separate chemical deicing system configured to spray a chemical deicer treatment on a vehicle; and wherein said singular, planar bladed scraping assembly may be used individually or in conjunction with said blower, and wherein said singular, planar bladed scraping assembly may be used individually or in conjunction with said blower, and wherein said singular, planar bladed scraping assembly may be used individually or in conjunction with said chemical deicing system; and wherein said blower, singular, planar bladed scraping assembly, and chemical deicing system may be used in conjunction; and wherein said support includes a mechanism which allows the orientation of each blower to be adjusted separately; and wherein said support includes a mechanism which allows the orientation of each blower to be adjusted remotely.

2. The article of claim 1, wherein the support holds at least three blowers.

3. The article of claim 1, wherein the support is attached to at least one tower.

4. The article of claim 1, wherein the support is attached to the side of a building.

5. The article of claim 3, wherein the support is vertically adjustable on the tower.

6. The article of claim 3, comprising two towers.

7. The article of claim 1, wherein the support has at least four blowers.

8. The article of claim 7, wherein the support has a length from 8 to 15 ft.

9. The article of claim 3, wherein the tower has a height of from 8 to 15 ft.

10. The article of claim 5, comprising a motor, wherein the motor adjustably increases or decreases the height of the support in relation to the ground.

11. The article of claim 1, wherein the blower has a nozzle, and the blower nozzle is movable adjustable vertically and horizontally.

\* \* \* \* \*